United States Patent
Riley et al.

(10) Patent No.: US 11,339,721 B2
(45) Date of Patent: May 24, 2022

(54) SYSTEM AND METHOD FOR SUPPLYING COMPRESSED AIR TO A MAIN ENGINE STARTER MOTOR

(71) Applicant: HONEYWELL INTERNATIONAL INC., Morris Plains, NJ (US)

(72) Inventors: Harold Riley, Gilbert, AZ (US); Michael Dwyer, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 558 days.

(21) Appl. No.: 16/190,461

(22) Filed: Nov. 14, 2018

(65) Prior Publication Data

US 2020/0149476 A1   May 14, 2020

(51) Int. Cl.
| | |
|---|---|
| *F02C 7/277* | (2006.01) |
| *F02C 7/057* | (2006.01) |
| *F02C 9/54* | (2006.01) |
| *F04D 27/02* | (2006.01) |

(52) U.S. Cl.
CPC .............. *F02C 7/277* (2013.01); *F02C 7/057* (2013.01); *F02C 9/54* (2013.01); *F04D 27/0246* (2013.01); *F05D 2220/50* (2013.01); *F05D 2260/85* (2013.01); *F05D 2270/101* (2013.01)

(58) Field of Classification Search
CPC ............................ F05D 2220/50; F02C 7/277
See application file for complete search history.

(56) References Cited

U.S. PATENT DOCUMENTS

| | | | |
|---|---|---|---|
| 3,678,285 | A | 7/1972 | Griffith |
| 4,428,194 | A | 1/1984 | Stokes et al. |
| 4,989,403 | A | 2/1991 | Rodgers |
| 5,435,125 | A | 7/1995 | Telakowski |

(Continued)

FOREIGN PATENT DOCUMENTS

| | | |
|---|---|---|
| EP | 0301993 A2 | 2/1989 |
| EP | 1662147 A1 | 5/2006 |
| EP | 3078837 A1 | 10/2016 |

OTHER PUBLICATIONS

McLin R., Process Automation A guide to effectively executing compressor control retrofits; Improving existing compressor control systems improves operations and energy efficiency; Nov./Dec. 2012.

*Primary Examiner* — Arun Goyal
*Assistant Examiner* — William L Breazeal
(74) *Attorney, Agent, or Firm* — Lorenz & Kopf, LLP

(57) ABSTRACT

A system and method for supplying compressed air from an auxiliary power unit to a main engine starter motor. The inlet guide vanes are controlled using either first or second inlet guide vane control logic and the surge control valve is controlled using either first or second surge control valve control logic. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve can be commanded to the fully-closed position only when maximum flow is commanded.

6 Claims, 4 Drawing Sheets

(56) References Cited

U.S. PATENT DOCUMENTS

| | | | |
|---|---|---|---|
| 6,865,891 B2 | 3/2005 | Walsh et al. | |
| 8,311,684 B2 | 11/2012 | Riverin | |
| 8,356,486 B2 | 1/2013 | Walters et al. | |
| 8,578,717 B2 | 11/2013 | Tonno et al. | |
| 8,666,633 B2 | 3/2014 | Ertz et al. | |
| 8,850,790 B2 | 10/2014 | McLeister et al. | |
| 9,567,906 B2 | 2/2017 | Nesdill et al. | |
| 9,845,734 B2 | 12/2017 | Zeiner et al. | |
| 10,041,414 B2 | 8/2018 | Zaccaria et al. | |
| 2003/0080244 A1* | 5/2003 | Dionne | B64D 33/08 244/57 |
| 2013/0039781 A1 | 2/2013 | Pascu et al. | |
| 2013/0333365 A1 | 12/2013 | Silet et al. | |
| 2014/0373553 A1 | 12/2014 | Zaccaria et al. | |
| 2015/0167553 A1* | 6/2015 | Nesdill | F02C 9/20 60/778 |
| 2016/0341131 A1* | 11/2016 | Nakagawa | F02C 3/22 |
| 2018/0010611 A1 | 1/2018 | Bae et al. | |
| 2018/0022464 A1 | 1/2018 | Gelwan et al. | |

\* cited by examiner

SYSTEM AND METHOD FOR SUPPLYING COMPRESSED AIR TO A MAIN ENGINE STARTER MOTOR

TECHNICAL FIELD

The present invention generally relates to main engine starter motor operation, and more particularly relates to a system and method for supplying compressed air to a main engine starter motor.

BACKGROUND

Many relatively large turbine engines, including aircraft main engines, may use a main engine starter motor to initiate turbine engine rotation. The main engine starter motor may be coupled to a source of compressed air, such as an on-board auxiliary power unit (APU), via a duct and a starter air valve. The compressed air impinges upon a turbine in the main engine starter motor causing it to rotate at a relatively high rate of speed. The main engine starter motor includes an output shaft that is coupled to the turbine and, perhaps via one or more gears, to the main engine gearbox such that the main engine is rotated with the main engine starter motor. When the main engine reaches a predetermined speed, the main engine is ignited such that a self-sustaining speed is achieved, and operation is enabled without further assistance. More recently developed main engines have tighter starting tolerances, thereby requiring a more precise control of the start operation. As an example, the main engine may require a cold motoring operation in which the main engine is rotated for a predetermined amount of time prior to ignition.

Although rare, and highly unlikely, there may be instances in which the starter air valve becomes inoperable. This valve is typically designed to be normally closed. Thus, if it becomes inoperable either before or during a main engine start operation, it will close, preventing compressed from reaching the starter motor. In such rare and unlikely instances, it may be necessary to manually move the starter air valve to the full-open position. While this allows compressed air to flow to the starter motor, the only means to modulate the flow of compressed air to the motor is to repeatedly command the surge control valve associated with the APU to move between its fully-open position and its fully-closed position. This results in undesirable wear to the surge control valve.

Hence, there is a need for a system and method of supplying compressed air to a main engine starter motor that does not rely on repeatedly commanding the APU surge control valve to move between an open position and its fully-closed position. The present invention addresses at least this problem.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for supplying compressed air to a main engine starter motor includes an auxiliary power unit (APU), a main engine start conduit, a surge control valve, and an APU control unit. The APU includes a compressor section and a turbine section, and the compressor section includes adjustable inlet guide vanes that are moveable to a plurality of inlet guide vane positions. The main engine start conduit is coupled to receive compressed air from the compressor section and supply the compressed air to the main engine starter motor. The surge control valve is in fluid communication with the main engine start conduit and is responsive to valve position commands to move between a fully-closed position and a plurality of open positions between the fully-closed and a fully-open position. The APU control unit is in operable communication with the APU and the surge control valve and is configured to control the APU, the inlet guide vanes, and the surge control valve. The APU control unit is configured to selectively control at least the inlet guide vanes and surge control valve using first or second inlet guide vane control logic and first or second surge control valve control logic, respectively. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve cannot be commanded to the fully-closed position only when maximum flow to the main engine starter motor is commanded.

In another embodiment, a method for supplying compressed air from an auxiliary power unit (APU) to a main engine starter motor, wherein the APU includes a compressor section and a turbine section, and the compressor section includes adjustable inlet guide vanes that are moveable to a plurality of inlet guide vane positions, wherein the APU supplies the compressed air to the main engine starter motor via main engine start conduit, and wherein a surge control valve is in fluid communication with the main engine start conduit. The method includes controlling the inlet guide vanes using one of first or second inlet guide vane control logic and controlling the surge control valve using one of first or second surge control valve control logic. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve can be commanded to the fully-closed position only when maximum flow to the main engine starter motor is commanded.

In yet another embodiment, an aircraft engine system includes a main gas turbine engine, a main engine starter motor, an auxiliary power unit (APU), a main engine start conduit, a surge control valve, and an APU control unit. The main engine starter motor is coupled to the main gas turbine engine. The main engine starter motor is coupled to receive compressed air and is configured, upon receipt of the compressed air, to supply a drive torque to the main gas turbine engine. The includes a compressor section and a turbine section, and the compressor section includes adjustable inlet guide vanes that are moveable to a plurality of inlet guide vane positions. The main engine start conduit is coupled to the main engine starter motor and the APU. The main engine start conduit is coupled to receive compressed air from the compressor section and supply the compressed air to the main engine starter motor. The surge control valve is in fluid communication with the main engine start conduit, and is responsive to valve position commands to move between a fully-closed position and a plurality of open positions. The APU control unit in operable communication with the APU and the surge control valve and configured to control the APU, the inlet guide vanes, and the surge control valve, the APU control unit is configured to selectively control at least the inlet guide vanes and surge control valve using first or second inlet guide vane control logic and first or second surge control valve control logic, respectively. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve can be commanded to the fully-closed position only when maximum flow to the main engine starter motor is commanded.

Furthermore, other desirable features and characteristics of the system and method for supplying compressed air to a main engine starter motor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
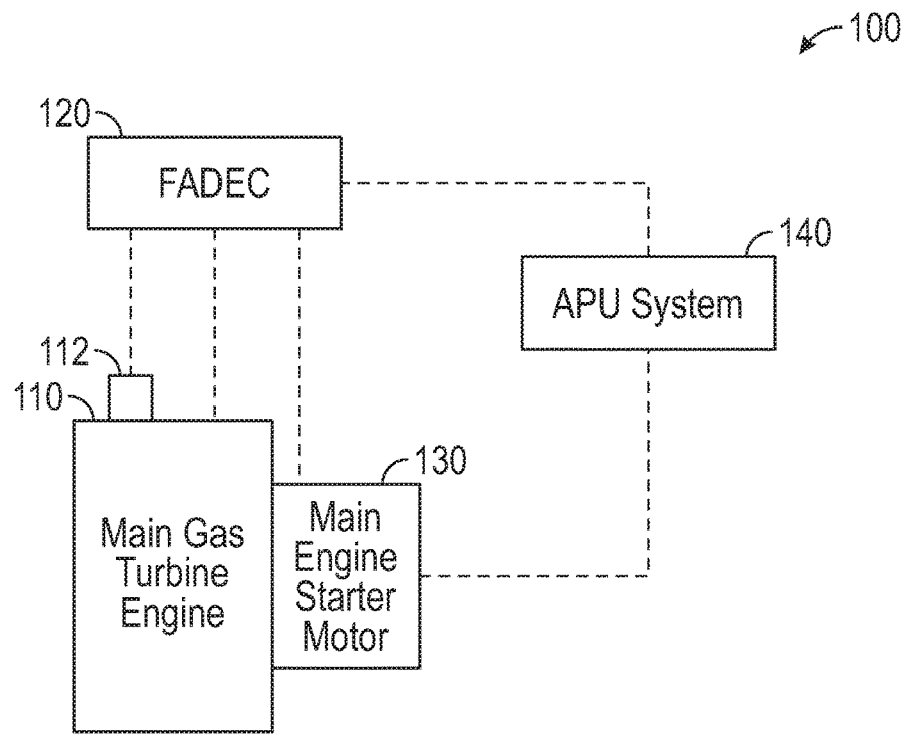
FIG. 1 depicts a schematic block diagram of an aircraft engine system in accordance with an exemplary embodiment.

FIG. 1 is a schematic block diagram of an aircraft engine system 100 in accordance with an exemplary embodiment. As shown, the engine system 100 includes a main gas turbine engine 110, a main engine full authority digital engine controller (FADEC) 120, a main engine starter motor 130, and an APU system 140. In one exemplary embodiment, the engine system 100 is an aircraft system, although other applications may be provided.

When implemented as an aircraft, the main gas turbine engine 110 is configured to generate mechanical power for propulsion of the aircraft and, in many instances, may also be used to drive various rotating components such as, for example, generators, compressors, and pumps, to thereby supply electrical, pneumatic, and/or hydraulic power. Although not depicted, the main gas turbine engine 110 typically includes a compressor system, a combustion system, a turbine system, and an exhaust system that function to generate power during aircraft taxi and flight operations, as generally recognized.

In addition to the power components, the main gas turbine engine 110 may include various sensors and actuators implemented at various locations to detect and adjust engine performance parameters, such as turbine rotational velocities, engine pressures, engine temperatures, and/or other controlled parameters, such as fuel flow and inlet guide vane positions. In the depicted embodiment, the main gas turbine engine(s) 110 includes at least one speed sensor 112 that functions to determine the speed of the main gas turbine engine(s) 110.

The FADEC 120 is generally configured to control operation of the engine system 100, including the main gas turbine engine(s) 110. The FADEC 120 may control any engine parameter, although as discussed below, the FADEC 120 may provide various commands to the main gas turbine engine(s) 110, the main engine starter motor 130, and the APU system 140 to control operation, particularly during a start operation. The commands generated by the FADEC 120 may be based on feedback from the main gas turbine engine(s) 110, including the engine speed provided by sensor 112, as well as operator commands, including the mode control signal discussed below. The commands from the FADEC 120 may be provided to one or more of the actuators to thereby control engine operation. For example, the actuators may be used to control the position or speed of one or more components to thereby manage engine parameters affecting engine operation. In other examples, the actuators may be used to open and/or shut valves to control fuel flow or to position one or more guide vanes to influence air flow through the engine.

As noted above, the engine system 100 further includes a main engine starter motor 130 to initiate engine rotation of the main gas turbine engine(s) 110, via a non-illustrated main engine gearbox, during a start operation. As such, the main engine starter motor 130 is coupled to a high-pressure fluid source, such as compressed air, which impinges upon a turbine in the main engine starter motor 130, thereby causing it to rotate at a relatively high rate of speed. The main engine starter motor 130 includes an output shaft that is coupled to the turbine and, via the main engine gearbox, to the main gas turbine engine 110. The output shaft of the main engine starter motor 130, rotated by the turbine, thus causes the main gas turbine engine 110 to begin rotating. Typically, the main engine starter motor 130 is configured to drive the main gas turbine engine 110 until a self-sustaining speed is reached, and the main gas turbine engine 110 can operate without the main engine starter motor 130.

Figure 2:
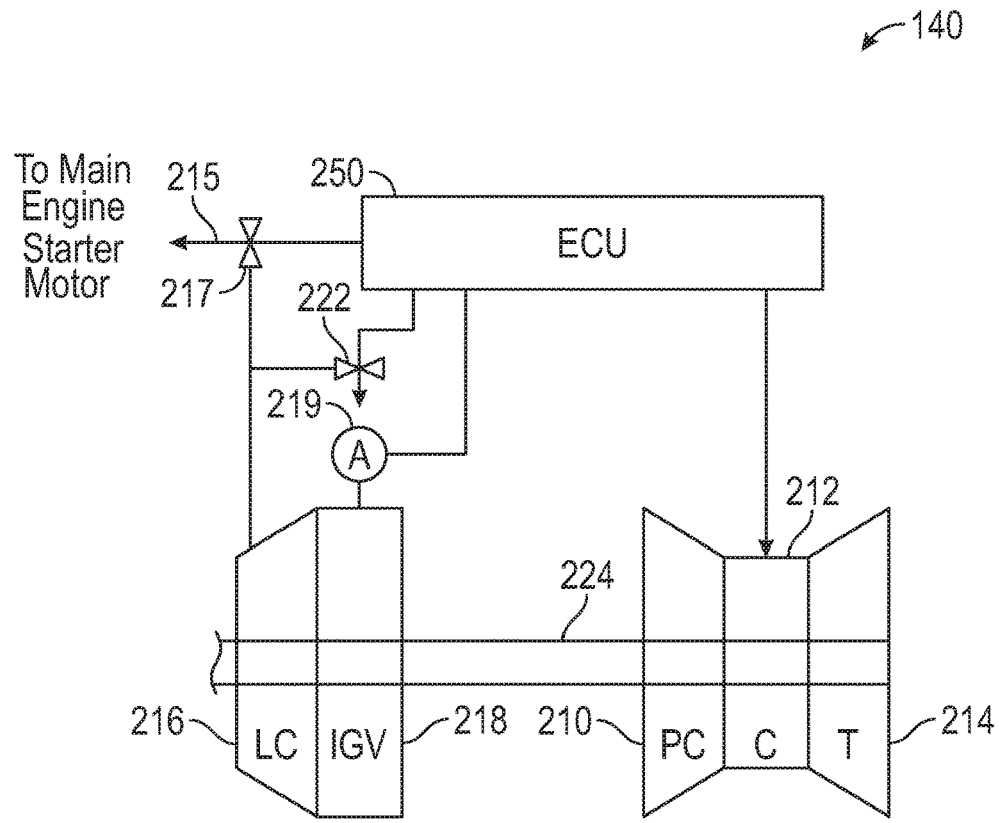
FIG. 2 depicts a schematic block diagram of an auxiliary power unit (APU) system of the aircraft engine system of FIG. 1 in accordance with an exemplary embodiment.

As is generally known, when an aircraft is on the ground, its main gas turbine engine(s) 110 may not be operating and/or capable of supplying power. In these instances, the APU system 140 may be utilized to supplement the main gas turbine engine(s) 110 by providing electrical and/or pneumatic power. The APU system 140 may also be used to supply pneumatic power to the main engine starter motor 130 to assist the start operation of the main gas turbine engine(s) 110. A schematic block diagram of one embodiment of an APU system 140 is depicted in FIG. 2, and with reference thereto will now be described.

The depicted APU system 140 includes an APU 200 and an APU control unit 250. A typical APU includes at least a compressor section, a combustion section, and a turbine section. The depicted APU 200 includes a power compressor 210, a combustor 212, a power turbine 214, and a load compressor 216. During operation, the power compressor 210 draws ambient air into an inlet, compresses the air, and supplies the compressed air to the combustor 212. It will be appreciated that the power compressor 210 may be implemented using any one of numerous types of compressors. For example, the power compressor 210 may be a single-stage or multi-stage centrifugal and/or axial compressor system.

The combustor 212 receives the compressed air from the power compressor 210, and also receives a flow of fuel from a non-illustrated fuel source. The fuel and compressed air are mixed within the combustor 212, and are ignited to produce relatively high-energy combustion gas. The combustor 212 may be implemented as any one of numerous types of combustors, including can-type combustors, reverse-flow combustors, through-flow combustors, and slinger combustors.

The relatively high-energy combustion gas that is generated in the combustor 212 is supplied to the turbine 214. As the high-energy combustion gas expands through the turbine 214, it impinges on the turbine blades, which causes the turbine 214 to rotate. It will be appreciated that the turbine 214 may be implemented using any one of numerous types of turbines. The turbine 214 includes an output shaft 224 that drives the power compressor 210 and the load compressor 216.

The load compressor 216, when driven, draws ambient air into an inlet, via a plurality of inlet guide vanes 218, and compresses the air. The compressed air may be supplied to various pneumatic loads, such as the main engine starter motor 130. Thus, as FIG. 2 also depicts, a main engine start conduit 215 is coupled to receive compressed air from the load compressor 216 and supplies the compressed air, via a starter air valve 217, to the main engine starter motor 130. As with the power compressor 210, the load compressor 216 may be implemented using any one of numerous types of compressors, including a single-stage or multi-stage centrifugal and/or axial compressor system.

As noted above, ambient air is drawn into the load compressor 216 via a plurality of adjustable inlet guide vanes 218. The inlet guide vanes 218 are disposed adjacent the inlet of the load compressor 216 and are movable, via one or more inlet guide vane actuators 219, to a plurality of positions. As such, air flow into and through the load compressor 216, and thus the air flow to the pneumatic loads, such as the main engine starter motor 130, may be regulated by adjusting the position of the inlet guide vanes 218. Actuation of the positions of the inlet guide vanes 218 are controlled via control logic that, at least in the depicted embodiment, is disposed within the APU control unit 250.

A portion of the air supplied from the load compressor 216 to the main engine start conduit 215 may be removed via a surge control valve 222 that is in fluid communication with the main engine start conduit 215. As is generally known, the surge control valve 222 may be provided to limit the pressure downstream of the compressor, as necessary or desired, and may be, for example, dumped overboard. The surge control valve 222 is responsive to valve position commands to move between a fully-closed position and a plurality of open positions. The surge control valve 222 may be positioned to vary the amount of air to the main engine starter motor 130. Specifically, it may be repeatedly moved between the fully-closed position and fully-open position to vary the amount of air the main engine starter motor 130. The position of the surge control valve 222 is controlled via control logic that, at least in the depicted embodiment, is disposed within the APU control unit 250.

The APU control unit 250 is in operable communication with the APU 200 and the surge control valve 222 and is configured to control the APU 200, the inlet guide vanes 218, and the surge control valve 222, based on instructions stored in memory and executed by a processor, as well as based on commands and feedback from the operator and/or other aircraft systems, such as the FADEC 120. During a start-up operation of the main gas turbine engine(s) 110, for example, the APU control unit 250 uses various sets of control logic to adjust compressed air flow supplied to the main engine start conduit 215, and thus to the starter air valve 217, to thereby assist in controlling the speed of the main engine starter motor 130 and thus the main gas turbine engine(s) 110. More specifically, as was just noted, the APU control unit 250 is configured to control the actuation of the inlet guide vanes 218 and the surge control valve 222 to supply a predetermined amount of air to the main engine start conduit 215 for use by the main engine starter motor 130 to drive the main gas turbine engine(s) 110 at a predetermined speed.

Figure 3:
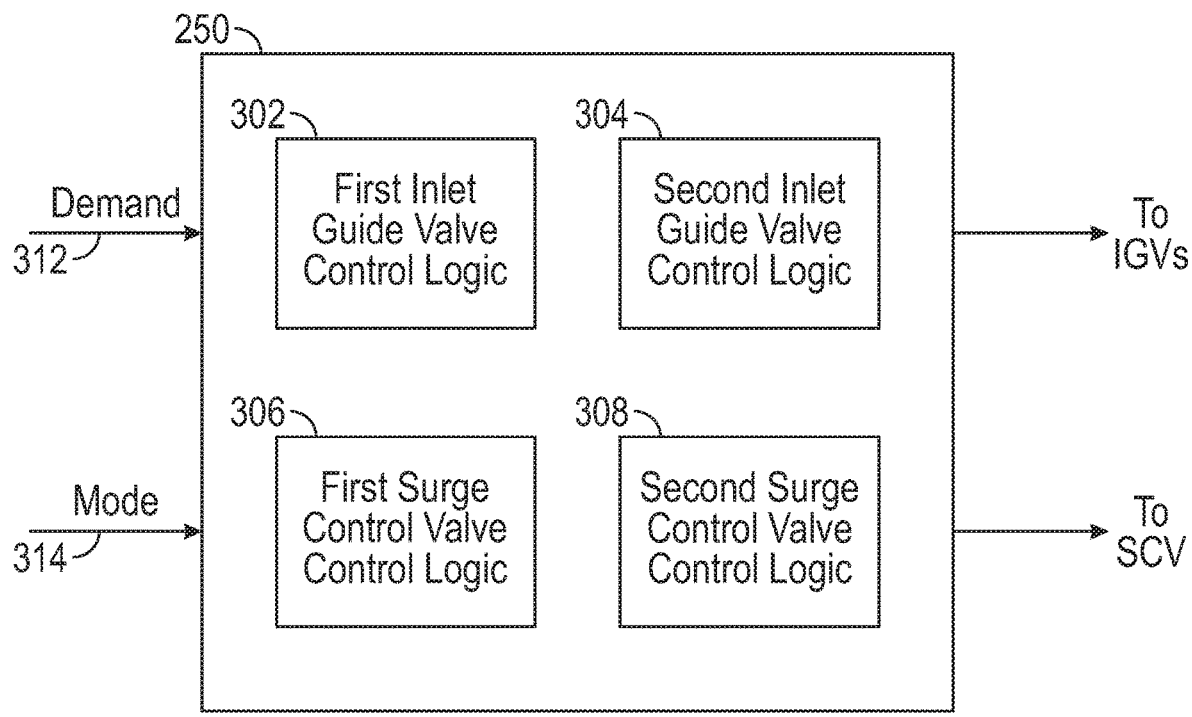
FIG. 3 depicts a block diagram of different logic that may be implemented in an electronic control unit (ECU) of the APU system of FIG. 2 in accordance with an exemplary embodiment.

As depicted more clearly in FIG. 3, the APU control unit 250 is configured to selectively control the inlet guide vanes 218 using one of two sets of control logic—first inlet guide vane control logic 302 or second inlet guide vane control logic 304. The APU control unit 250 is also configured to selectively control the surge control valve 222 using one of two sets of control logic—first surge control valve control logic 306 or second surge control valve control logic 308. It should be noted that the first inlet guide vane control logic 302 and the first surge valve control logic 306 are each implemented using conventionally known logic and are each the default logic used for a main gas turbine engine start-up operation. When the first inlet guide vane control logic 302 is used, the inlet guide vanes 218 are positioned based on a demand signal 312. When the first surge control valve logic 306 is used, the surge control valve 222 is also positioned based on the demand signal 312 and can be commanded to be repeatedly moved between the fully-closed position and the fully-open position. One example of known first inlet guide vane control logic 302 and known first surge valve control logic 306 is disclosed in U.S. Pat. No. 9,567,906, the entirety of which is hereby incorporated by reference. However, other conventionally known control logic schemes can also be used.

As FIG. 3 further depicts, the APU control unit 250 is also adapted to receive a mode control signal 314. The mode control signal 314 may be supplied from, for example, an aircraft system in the cockpit, either automatically or in response to input from a user. The mode control signal 314 may be supplied (automatically or manually) in response to any one of numerous conditions. In one embodiment, the mode control signal 314 is supplied in the unlikely event that the starter air valve 217 becomes inoperable. In such instances, the starter air valve 217 may need to be held open manually.

Regardless of the source or reason for supplying the mode control signal 314, the APU control unit 250 is configured, upon receipt of the mode control signal 314, to control the inlet guide vanes 218 using the second inlet guide vane control logic 304 and to control the surge control valve 222 using the second surge control valve control logic 308. As will be described in more detail, when the second inlet guide vane control logic 304 is used, the inlet guide vanes 218 are positioned based on a demand schedule, and when the second surge control valve logic 308 is used, the surge control valve 222 can only be commanded to its fully-closed position when maximum flow (e.g., 100% flow) is commanded. Thus, when maximum flow is not commanded, the surge control valve 222 can be commanded to a valve position between the fully-open position and a minimum open position, where the minimum open position is a position between the fully-closed position and the fully-open position. As will also be described, the minimum open position the surge control valve 222 can be commanded to is variable, and the minimum open position is determined in response to the demand signal 312. The APU control unit 250 is further configured, when using the second surge control valve logic, to limit the rate of movement of the surge control valve 222.

Figure 4:
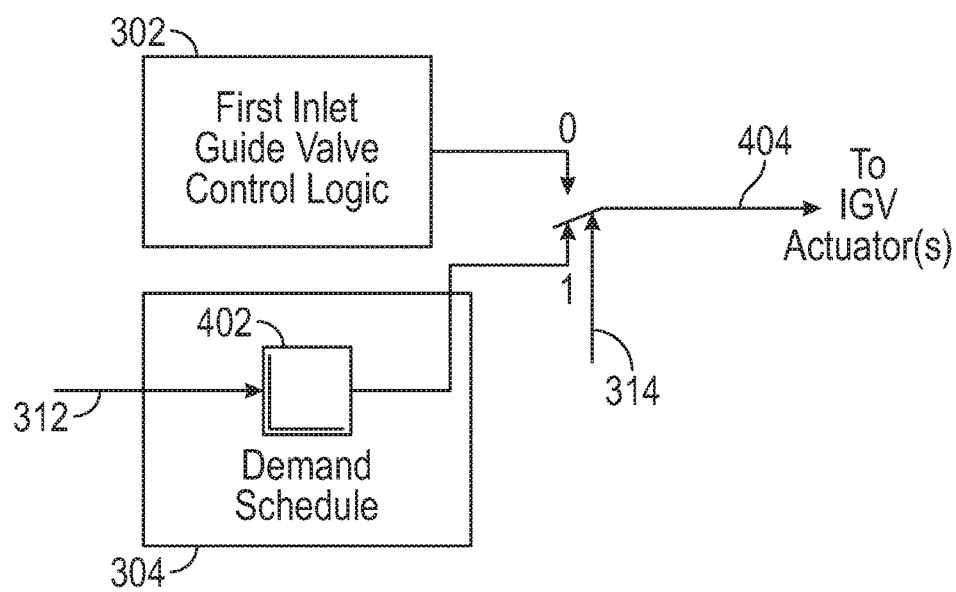
FIG. 4 depicts an alternate inlet guide vane control logic that may be implemented in the ECU of FIG. 3.
Figure 5:
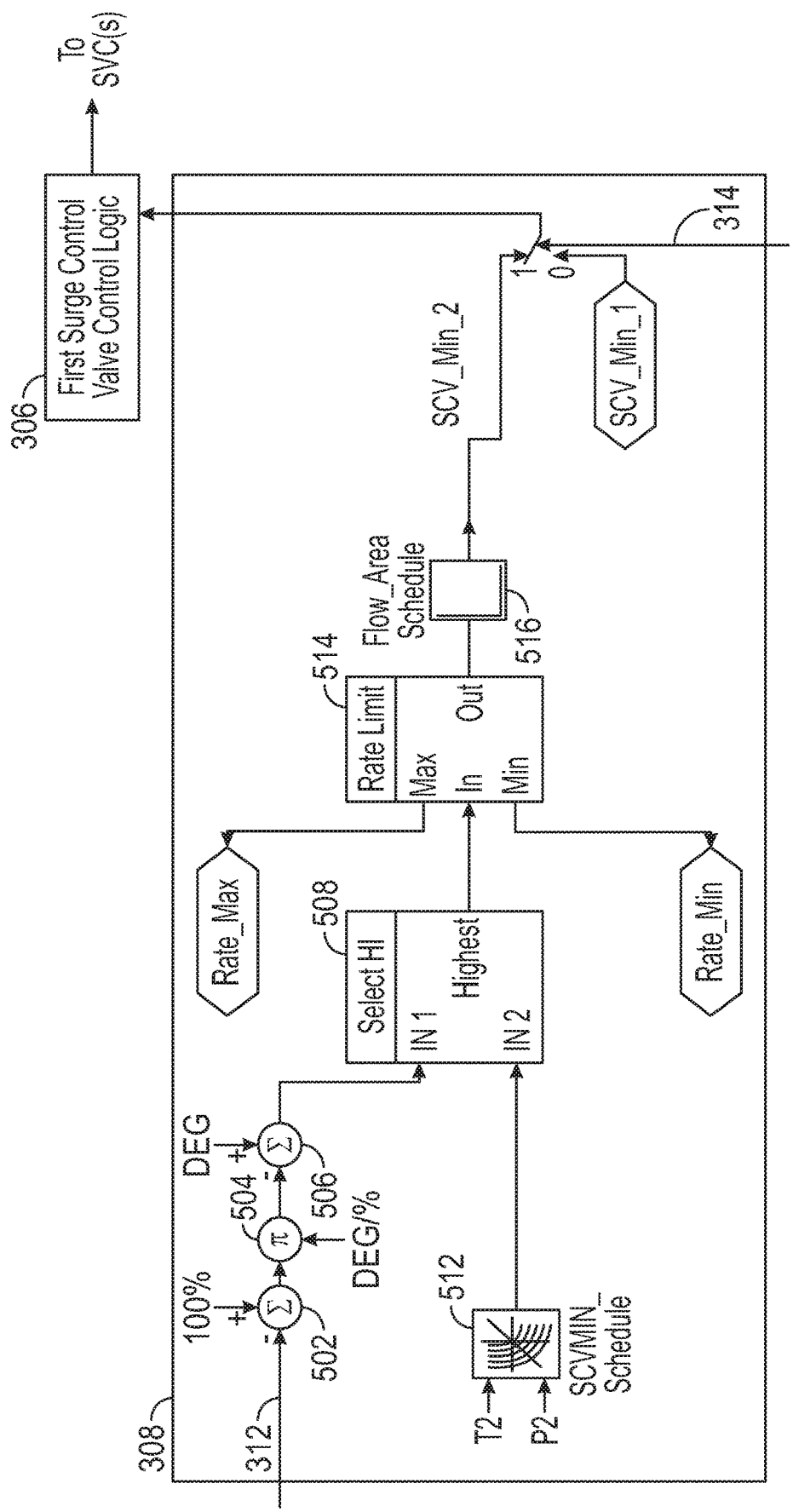
FIG. 5 depicts an alternate surge control valve control logic that may be implemented in the ECU of FIG. 3.

A more detailed representation of second inlet guide vane control logic 304 is depicted in FIG. 4, and a more detailed representation of the second surge control valve control logic 308 is depicted in FIG. 5. For completeness, these control logics 304, 306 will now be described, starting with the second inlet guide vane control logic 304.

The second inlet guide vane control logic 304, as noted above and as illustrated more clearly in FIG. 4, is used upon receipt of the mode control signal 314 and is implemented using a demand schedule 402. The demand schedule 402, which may be implemented as a look-up table stored in a memory storage device, receives the demand signal 312 and, based on the requested demand, determines (e.g., looks up) the appropriate inlet guide vane position command 404 to be supplied to the inlet guide vane actuators 219.

The second surge control valve control logic 308 is also used upon receipt of the mode control signal 314. Some of the specific logic functions that are used, however, depend upon whether compressed air from the APU 200 is being used to start one or two main gas turbine engines 110. In most instance, the compressed air will be used to start two main gas turbine engines 110. In such instances, the second surge control valve control logic 308, in response to the demand signal 312, implements a first SUMMATION function 502, a MULTIPLICATION function 504, and a second SUMMATION function 506, and supplies the output of the second SUMMATION function 506 to a first input of a dual-input SELECT HI function 508. The first SUMMATION function 502 determines the difference between the demanded flow percentage, represented by demand signal 312, and 100% flow. This resultant is supplied to the MULTIPLICATION function 504, which multiplies it by a constant (expressed in degrees/%) and supplies the resultant (expressed in degrees) to the second SUMMATION function 506. The second SUMMATION function 506 determines the difference between a predetermined constant number of degrees (which corresponds to a full-open position) and the resultant output from the MULTIPLICATION function 504.

In the rare instances that compressed air from the APU 200 is being used to start only one main gas turbine engines 110, the second input of the dual-input SELECT HI function 508 is supplied with a value from a minimum valve position schedule 512. The minimum valve position schedule 512 is implemented using a two-dimensional INTERPOLATION function, in which the output value is a function of two variables. In the depicted embodiment, the variables are inlet air temperature (T2) and ambient pressure (P2).

The dual-input SELECT HI function 508, as is generally known, selects and outputs the higher of the values at its two inputs. Thus, if compressed air from the APU 200 is being used to start only one main gas turbine engines 110, the higher value will be supplied from the minimum valve position schedule 512. Conversely, if compressed air from the APU 200 is being used to start two main gas turbine engines 110, the higher value will be supplied from the second SUMMATION function 506. Again, in most instances compressed air from the APU 200 will be used to start two main gas turbine engines 110.

In both instances, however, the output of the SELECT HI function 508 is supplied to a RATE LIMIT function 514, which limits the rate-of-change of position of the surge control valve 222. The rate-of-change is limited to a predetermined value (RATE_MAX), which may be selected based on, for example, valve type or any one of numerous design and/or operational criteria.

The output of the RATE LIMIT function 514 is supplied to a flow area schedule 516. The flow area schedule 516, which may be implemented as a look-up table stored in a memory storage device, receives the output of the RATE LIMIT function 514, and based on the output, determines (e.g., looks up) the minimum open position (SCV_MIN_2) to which the surge control valve 222 can be commanded. This value is supplied to the first surge control valve logic 306, which uses this value to limit the minimum open position to a position between the fully-closed position and the full-open position. As FIG. 5 also depicts, when the mode control signal 314 is not supplied, a predetermined minimum open position (SCV_MIN_1) is supplied to the first surge control valve logic 306. As may be appreciated, this predetermined value corresponds to the fully-closed position.

Figure 6:
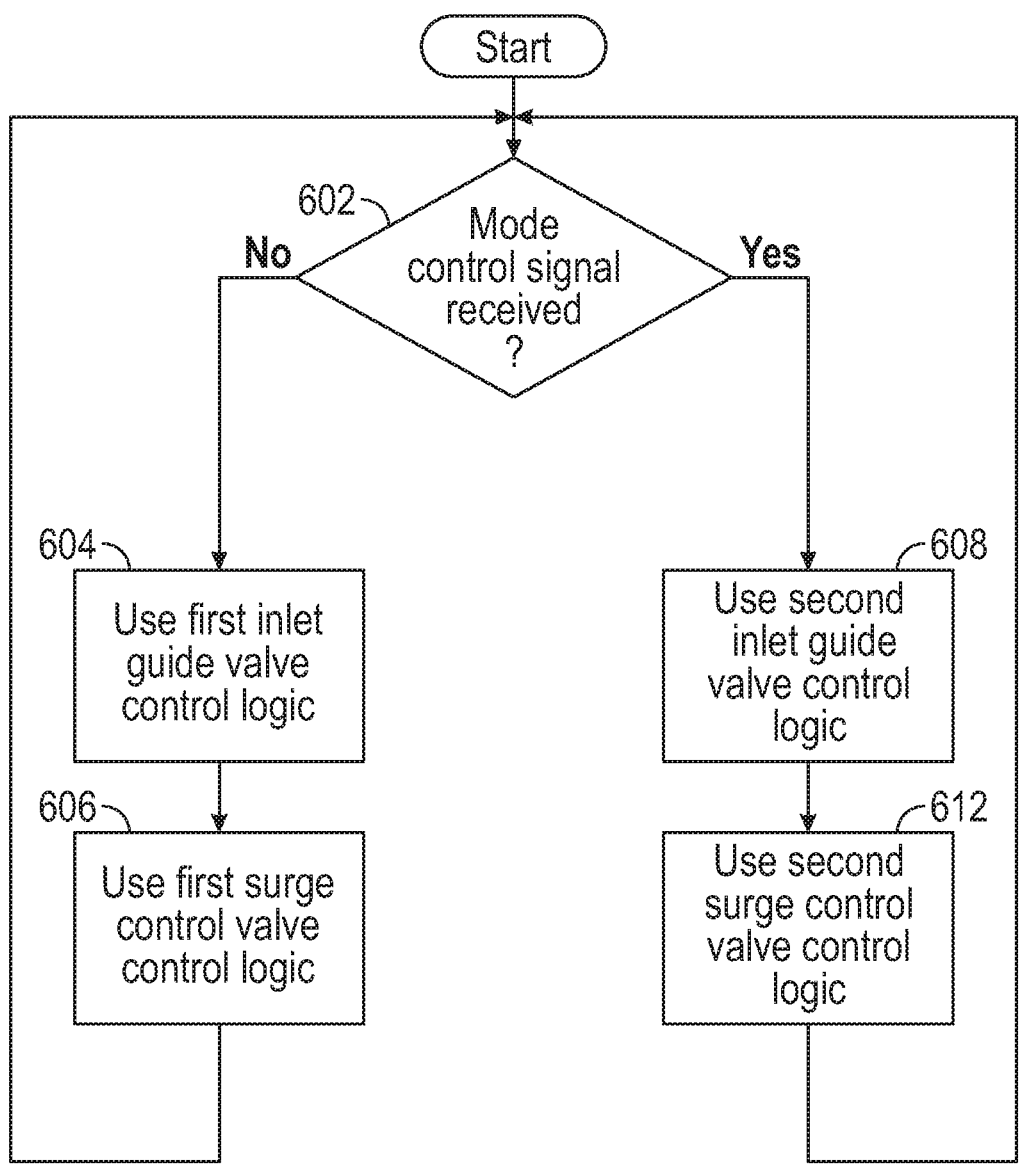
FIG. 6 depicts a flowchart of a method implemented in the ECU of FIG. 3 for controlling the supply of compressed air from an APU to a main engine starter motor.

Referring now to FIG. 6, a flowchart of a method implemented in the FCU ECU 250 for supplying compressed air from the APU 200 to a main engine starter motor 130 is depicted and, for completeness, will now be described. The method 600 begins by determining if the mode control signal 314 has been received (602). If not, then the inlet guide vanes 218 are controlled using the first inlet guide vane control logic 302 (604) and the surge control valve 222 is controlled using the first surge control valve control logic 306 (606). As has been repeatedly noted, when the first inlet guide vane control logic 302 is used, the inlet guide vanes 218 are positioned based on the demand signal 312, and when the first surge control valve logic 306 is used, the surge control valve 222 can be commanded to repeatedly move between the fully-closed position and the fully-open position.

If, however, the mode control signal 314 has been received, then the inlet guide vanes 218 are controlled using the second inlet guide vane control logic 304 (608) and the surge control valve 222 is controlled using the second surge control valve control logic 308 (612). As has also been repeatedly noted, when the second inlet guide vane control logic 304 is used, the inlet guide vanes 218 are positioned based on a demand schedule, and when the second surge control valve logic 308 is used, the surge control valve 222 can only be commanded to the fully-closed position when the demand signal 312 supplied is representative of 100% flow to the main engine starter motor 130.

The system and method described herein provide a means for supplying compressed air to a main engine starter motor that does not rely on repeatedly commanding the APU surge control valve to move between an open position and its fully-closed position.

In one embodiment, a system for supplying compressed air to a main engine starter motor includes an auxiliary power unit (APU), a main engine start conduit, a surge control valve, and an APU control unit. The APU includes a compressor section and a turbine section, and the compressor section includes adjustable inlet guide vanes that are moveable to a plurality of inlet guide vane positions. The main engine start conduit is coupled to receive compressed air from the compressor section and supply the compressed air to the main engine starter motor. The surge control valve is in fluid communication with the main engine start conduit and is responsive to valve position commands to move between a fully-closed position and a plurality of open positions between the fully-closed and a fully-open position. The APU control unit is in operable communication with the APU and the surge control valve and is configured to control the APU, the inlet guide vanes, and the surge control valve. The APU control unit is configured to selectively control at least the inlet guide vanes and surge control valve using first or second inlet guide vane control logic and first or second surge control valve control logic, respectively. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve cannot be commanded to the fully-closed position only when maximum flow to the main engine starter motor is commanded.

These aspects and other embodiments may include one or more of the following features. When the APU control unit uses the second surge control valve logic, the surge control valve can be commanded to a valve position between a fully-open position and a minimum open position, and the minimum open position is a position between the fully-closed position and the full-open position. The minimum open position may be variable. The APU control unit may be adapted to receive a flow demand signal and configured, in response to the flow demand signal, to determine the minimum open position. The APU control unit may be adapted to receive a mode control signal and configured, upon receipt of the mode control signal, to control the inlet guide vanes and surge control valve using the second inlet guide vane control logic and the second surge control valve control logic, respectively. The APU control unit may be further configured, when using the second surge control valve logic, to limit a rate of movement of the surge control valve.

In another embodiment, a method for supplying compressed air from an auxiliary power unit (APU) to a main engine starter motor, wherein the APU includes a compressor section and a turbine section, and the compressor section includes adjustable inlet guide vanes that are moveable to a plurality of inlet guide vane positions, wherein the APU supplies the compressed air to the main engine starter motor via main engine start conduit, and wherein a surge control valve is in fluid communication with the main engine start conduit. The method includes controlling the inlet guide vanes using one of first or second inlet guide vane control logic and controlling the surge control valve using one of first or second surge control valve control logic. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve can be commanded to the fully-closed position only when maximum flow to the main engine starter motor is commanded.

These aspects and other embodiments may include one or more of the following features. When the second surge control valve logic is used, the surge control valve can be commanded to a valve position between a fully-open position and a minimum open position, and the minimum open position is a position between the fully-closed position and the full-open position. The minimum open position may be variable. The minimum open position may be determined based on a flow demand signal. The inlet guide vanes and surge control valve may be controlled using the second inlet guide vane control logic and the second surge control valve control logic, respectively, in response to a mode control signal. A rate of movement of the surge control valve may be limited when the second surge control valve logic is used.

In yet another embodiment, an aircraft engine system includes a main gas turbine engine, a main engine starter motor, an auxiliary power unit (APU), a main engine start conduit, a surge control valve, and an APU control unit. The main engine starter motor is coupled to the main gas turbine engine. The main engine starter motor is coupled to receive compressed air and is configured, upon receipt of the compressed air, to supply a drive torque to the main gas turbine engine. The includes a compressor section and a turbine section, and the compressor section includes adjustable inlet guide vanes that are moveable to a plurality of inlet guide vane positions. The main engine start conduit is coupled to the main engine starter motor and the APU. The main engine start conduit is coupled to receive compressed air from the compressor section and supply the compressed air to the main engine starter motor. The surge control valve is in fluid communication with the main engine start conduit, and is responsive to valve position commands to move between a fully-closed position and a plurality of open positions. The APU control unit in operable communication with the APU and the surge control valve and configured to control the APU, the inlet guide vanes, and the surge control valve, the APU control unit is configured to selectively control at least the inlet guide vanes and surge control valve using first or second inlet guide vane control logic and first or second surge control valve control logic, respectively. When the first inlet guide vane control logic is used, the inlet guide vanes are positioned based on a demand signal, when the second inlet guide vane control logic is used, the inlet guide vanes are positioned based on a demand schedule, when the first surge control valve logic is used, the surge control valve can be commanded to repeatedly move to only a fully-closed position and a fully-open position, and when the second surge control valve logic is used, the surge control valve can be commanded to the fully-closed position only when maximum flow to the main engine starter motor is commanded.

These aspects and other embodiments may include one or more of the following features. When the APU control unit uses the second surge control valve logic, the surge control valve can be commanded to a valve position between a fully-open position and a minimum open position, and the minimum open position is a position between the fully-closed position and the full-open position. The minimum open position may be variable. The APU control unit may be adapted to receive a flow demand signal and configured, in response to the flow demand signal, to determine the minimum open position. The APU control unit may be adapted to receive a mode control signal and configured, upon receipt of the mode control signal, to control the inlet guide vanes and surge control valve using the second inlet guide vane control logic and the second surge control valve control logic, respectively. The APU control unit may be further configured, when using the second surge control valve logic, to limit a rate of movement of the surge control valve.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for supplying compressed air to a main engine starter motor, comprising:
   an auxiliary power unit (APU) including a compressor section and a turbine section, the compressor section including adjustable inlet guide vanes that are moveable to a plurality of inlet guide vane positions;
   a main engine start conduit coupled to receive the compressed air from the compressor section and supply the compressed air to the main engine starter motor;
   a surge control valve in fluid communication with the main engine start conduit, the surge control valve responsive to valve position commands to move between a fully-closed position and a plurality of open positions between the fully-closed and a fully-open position; and
   an APU control unit in operable communication with the APU and the surge control valve and configured to control the APU, the adjustable inlet guide vanes, and the surge control valve, the APU control unit adapted to receive a demand signal and configured to selectively control at least the adjustable inlet guide vanes and the surge control valve using first inlet guide vane control logic or second inlet guide vane control logic and first surge control valve control logic or second surge control valve control logic, respectively,
   wherein:
   when the first inlet guide vane control logic is used, the adjustable inlet guide vanes are positioned based on the demand signal,
   when the second inlet guide vane control logic is used, the adjustable inlet guide vanes are positioned based on a demand schedule,
   when the first surge control valve logic is used, the surge control valve can be commanded to repeatedly move to only the fully-closed position and the fully-open position, and
   when the second surge control valve logic is used, the surge control valve cannot can be commanded to the fully-closed position only when maximum flow to the main engine starter motor is commanded, and the surge control valve can be commanded to a valve position between the fully-open position and a minimum open position;
   the minimum open position is variable and is between the fully-closed position and the fully-open position; and
   the APU control unit is configured, in response to the demand signal, to determine the minimum open position.

2. The system of claim 1, wherein the APU control unit is adapted to receive a mode control signal and is configured, upon receipt of the mode control signal, to control the adjustable inlet guide vanes and surge control valve using the second inlet guide vane control logic and the second surge control valve control logic, respectively.

3. The system of claim 1, wherein the APU control unit is further configured, when using the second surge control valve logic, to limit a rate of movement of the surge control valve.

4. An aircraft engine system, comprising:
   a main gas turbine engine;
   a main engine starter motor coupled to the main gas turbine engine, the main engine starter motor coupled to receive compressed air and configured, upon receipt of the compressed air, to supply a drive torque to the main gas turbine engine;
   an auxiliary power unit (APU) including a compressor section and a turbine section, the compressor section including adjustable inlet guide vanes that are moveable to a plurality of inlet guide vane positions;
   a main engine start conduit coupled to the main engine starter motor and the APU, the main engine start conduit coupled to receive compressed air from the compressor section and supply the compressed air to the main engine starter motor;
   a surge control valve in fluid communication with the main engine start conduit, the surge control valve responsive to valve position commands to move between a fully-closed position and a plurality of open positions; and
   an APU control unit in operable communication with the APU and the surge control valve and configured to control the APU, the adjustable inlet guide vanes, and the surge control valve, the APU control unit adapted to receive a demand signal and configured to selectively control at least the adjustable inlet guide vanes and surge control valve using first inlet guide vane control logic or second inlet guide vane control logic and first surge control valve control logic or second surge control valve control logic, respectively, wherein:

when the first inlet guide vane control logic is used, the adjustable inlet guide vanes are positioned based on the demand signal, when the second inlet guide vane control logic is used, the adjustable inlet guide vanes are positioned based on a demand schedule, when the first surge control valve logic is used, the surge control valve can be commanded to repeatedly move to only the fully-closed position and a fully-open position, and when the second surge control valve logic is used, the surge control valve can be commanded to the fully-closed position only when maximum flow to the main engine starter motor is commanded, and the surge control valve can be commanded to a valve position between the fully-open position and a minimum open position;

the minimum open position is variable and is between the fully-closed position and the fully-open position; and the APU control unit is configured, in response to the demand signal, to determine the minimum open position.

5. The aircraft engine system of claim 4, wherein the APU control unit is adapted to receive a mode control signal and is configured, upon receipt of the mode control signal, to control the adjustable inlet guide vanes and surge control valve using the second inlet guide vane control logic and the second surge control valve control logic, respectively.

6. The aircraft engine system of claim 4, wherein the APU control unit is further configured, when using the second surge control valve logic, to limit a rate of movement of the surge control valve.

\* \* \* \* \*